Sept. 29, 1964  J. R. JOHNSON  3,150,758
BOTTLE HANDLING APPARATUS
Filed July 18, 1962  3 Sheets-Sheet 1
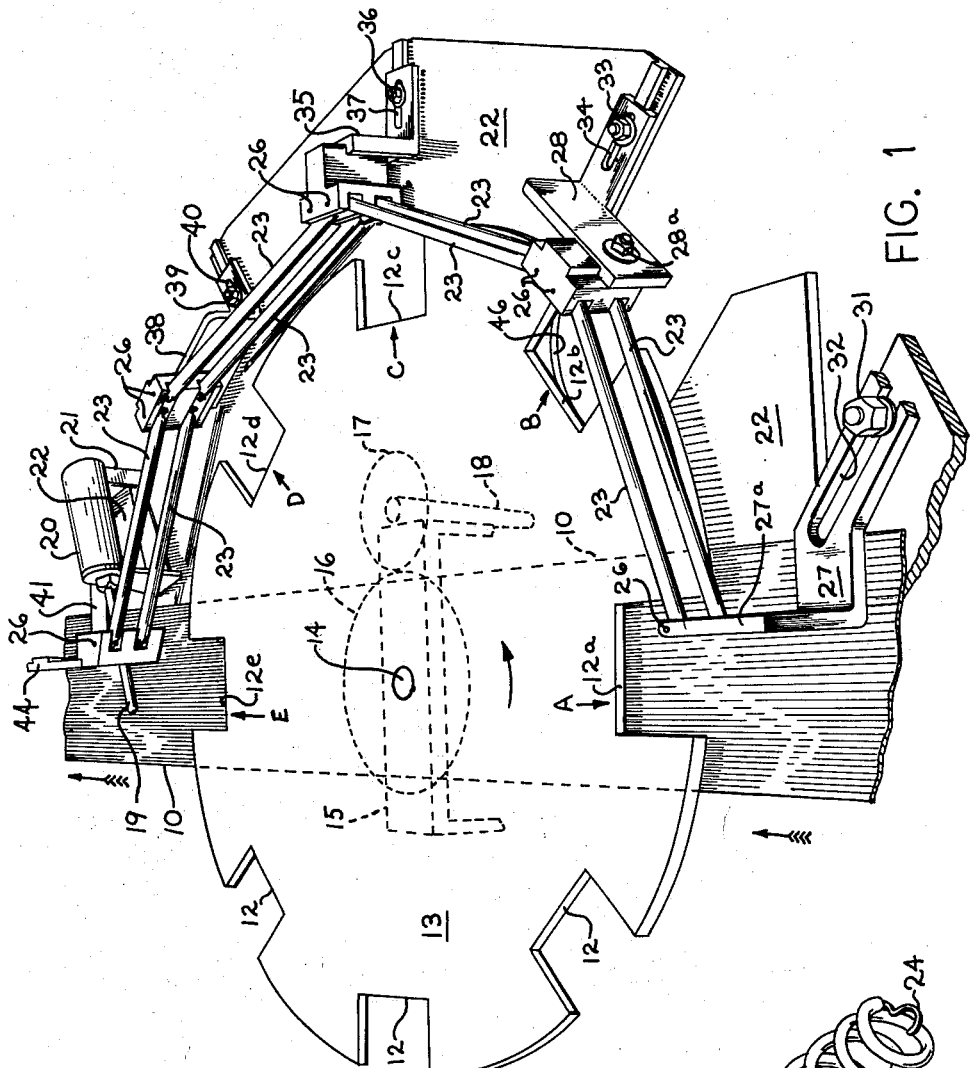
INVENTOR.
JOHN R. JOHNSON
BY
ATTORNEYS

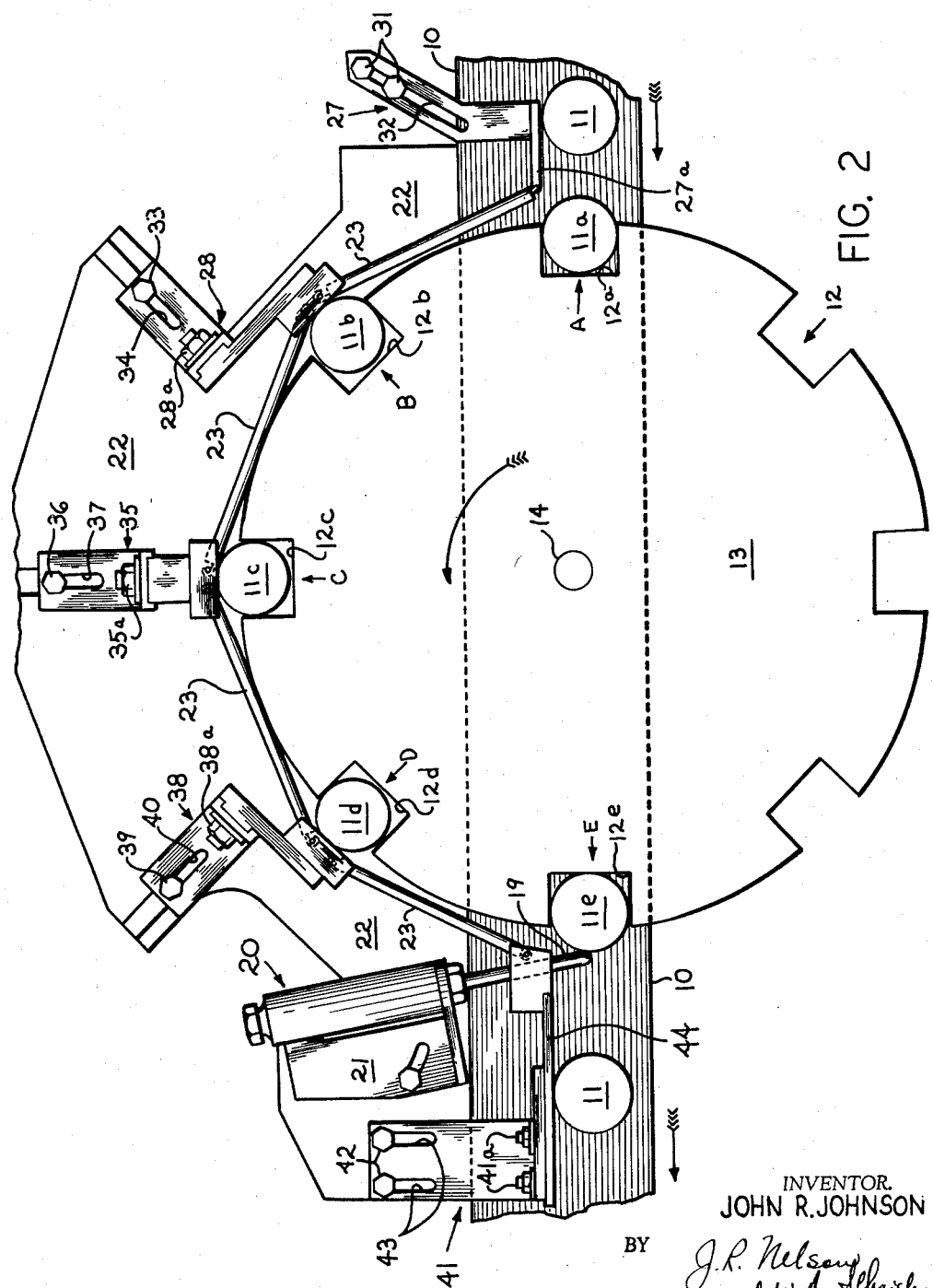

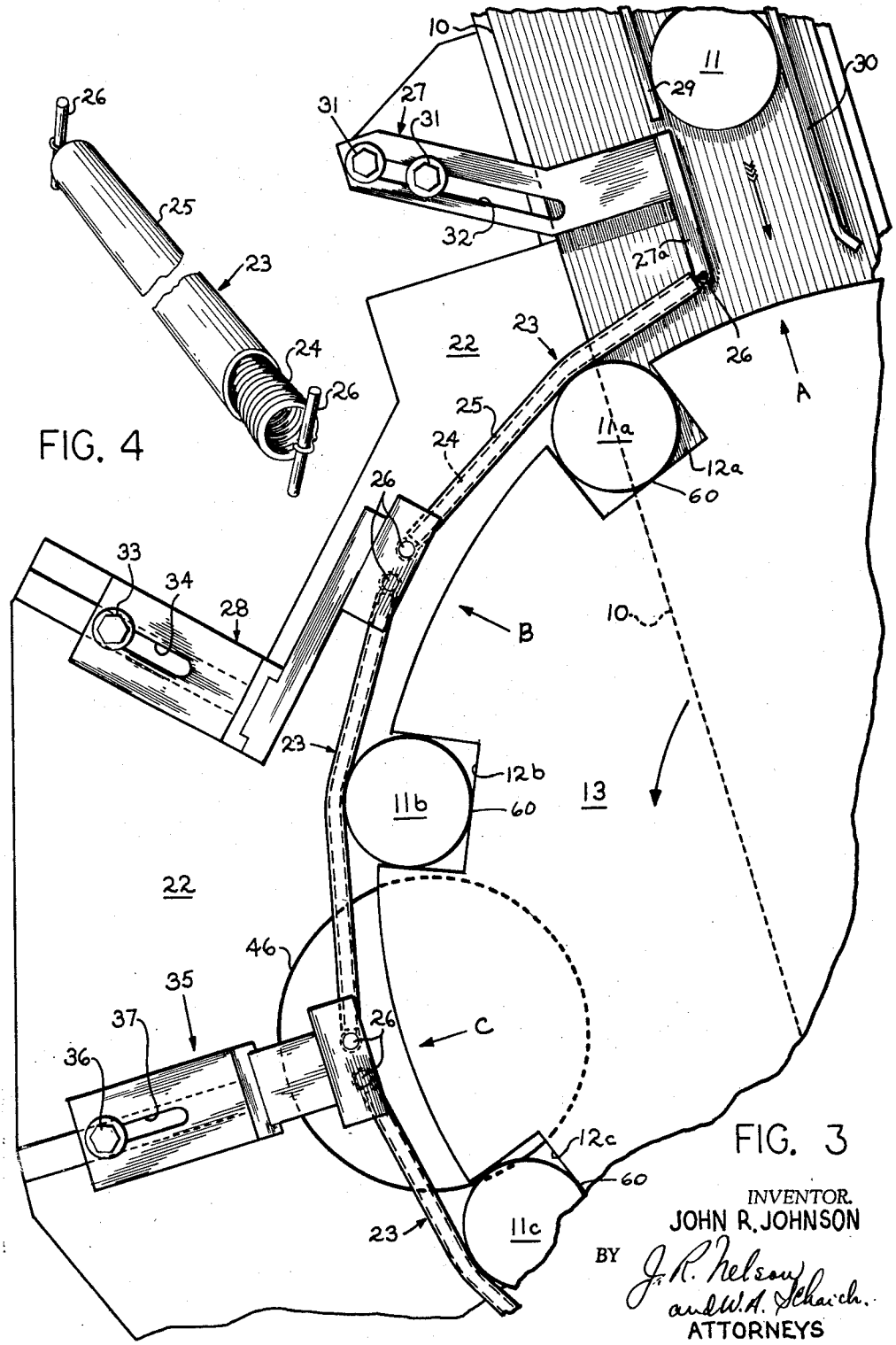

United States Patent Office 3,150,758
Patented Sept. 29, 1964

3,150,758
BOTTLE HANDLING APPARATUS
John R. Johnson, Toledo, Ohio, assignor to Owens-Illinois Glass Company, a corporation of Ohio
Filed July 18, 1962, Ser. No. 210,703
5 Claims. (Cl. 198—25)

The present invention relates to handling of containers, such as glass bottles, jars and the like, in transferring them on a moving conveyance, and more particularly, the invention relates to a positive, yieldable, stationary guide device used in conjunction with a rotary starwheel transfer unit that guides and changes direction of the containers moving in essentially seriatim fashion on a conveyor path to a second conveyor path spaced from the first or extending in a different direction from the first path.

The illustrated preferred form of the invention, as will be presently described, is shown in its application on handling glassware in a high speed gauging machine. Various patents disclose solutions to the problem for guiding and maintaining the ware in the pockets of the starwheel units in handling the ware in these units. One example is the vacuum device used on the turret starwheel in the patent to F. Z. Fouse, No. 3,018,889; or the earlier patent to J. G. Drennan, No. 2,800,226. Another example is the type turret which employs sets of ware gripping jaws, as in the patent to Fedorchak, No. 2,371,-748.

In handling the ware through processing on conveyors or in intermittent turret-type inspecting devices, the desirable speeds for processing the containers in the inspecting equipment ranges from 70 to 180 pieces per minute. Thus, in the intermittent type starwheel unit where the ware is shifted from station to station, as in U.S. Patent 2,371,748, this means that there are to be 70–180 indexes per minute and the ware must be moved about the arcuate peripheral path of the starwheel in that number of stop and start movements. This requires the turret or starwheel to achieve high plus and minus accelerations and velocities, which in turn, create centrifugal forces on the ware tending to dislodge it from or throw it from the pocket of the starwheel. As was stated, vacuum cups in the pockets of the turret is one prior solution to this problem. Pincher type jaws are another. However, these mechanisms are relatively complex, require considerable maintenance and adjustment and are quite costly to install and operate.

It is, therefore, an object of the present invention to provide a simple, yet efficient means for overcoming the above in retaining the ware in the starwheel during index or transfer.

It is also an object of the invention to provide such a guide that is easily adaptable to existing starwheel or pocket type turret equipment without rebuilding the unit, yet be universally suitable and adjustable on the machine where used to enable handling a wide variety of sizes of containers.

The specific nature of this invention, as well as other objects and advantages thereof, will become apparent to those skilled in the art from the following detailed description, taken in conjunction with the annexed sheets of drawings, on which, by way of preferred example only, are illustrated embodiments of this invention.

In the drawings:
FIG. 1 is a top perspective view of a starwheel or turret type machine utilizing the invention;
FIG. 2 is a plan view of the same machine, as shown in FIG. 1, but illustrates containers handled by the turret as it is at rest presenting containers to three peripherally arranged inspecting stations of the machine;
FIG. 3 is a partial and enlarged plan view of the machine of FIG. 2, but illustrates the turret at a point of its indexing or advancing movement whereby the resilient guide means of the invention is in operation retaining the containers positively in the pockets of the turret;
FIG. 4 is a perspective view of the first embodiment of the invention, which depicts the coil spring-plastic tube type resilient guide member;
FIG. 5 is a perspective view of a second embodiment of the invention, showing a coil spring and steel strap unit covered with a plastic tube which is used as the resilient guide member; and
FIG. 6 is a perspective view of a third embodiment of the invention, which shows a coil spring coated with plastic.

In the illustrated form of the invention, FIGS. 1–3 show a straight-line conveyor 10 which extends horizontally and carries containers 11 along a first path into engagement with one of the plurality of U-shaped pockets 12 of the starwheel or turret member 13. The turret 13 is rotatably mounted on a vertical shaft 14 that is rotatable in a frame 15. The shaft and turret are also provided with a driven sprocket 16 that is in driving mesh with pinion 17 on the drive shaft 18. Shaft 18 is driven by any suitable drive means such as an electric motor and transmission unit (not shown). The transmission may be a Geneva-type intermittent drive transmission that advances each of the plural pockets 12 through stations A–E in sequence. The containers 11 are stopped at each of the stations A–E to perform one or more inspections thereon by means not particularly important to this invention. At the inspecting stations (such as station B on FIG. 1), the containers are singly brought to rest on a pad 46 which may be suitably connected to a rotary drive means and rotated for inspection or may merely be supported on such a pad 46 and the inspecting device operated. In moving the containers 11 from one station to the next, the U-shaped pocket 12 in which it is nested slides the container over a flat bottom support, such as the horizontal plate of frame 22 of the machine.

In the illustrated embodiment of FIGS. 2 and 3, conveyor 10 is driven so that it advances from right to left on FIG. 2. Containers 11a, 11b, 11c, 11d and 11e are successively brought into U-shaped pockets of the turret, marked 12a, 12b, 12c, 12d and 12e, for identification, at the loading station A. By the time these containers advance to station E, they are retained by a reciprocated stop member 19 actuated by a reciprocating cylinder-piston type motor 20 that is mounted stationary on a bracket 21 on the frame 22 of the machine. If the container, such as 11e, has passed its various inspections at the stations B, C or D, the rod 19 is retracted and the container advances in its final path on conveyor 10. If it has not passed its inspection, however, the rod 19 remains extended and the turret 13 will advance this container, such as 11e, over the side of the conveyor and into a reject hopper (not shown).

Mounted about the arcuate periphery of the turret or starwheel 13 are the plural resilient members 23 of the invention. These are elongated resilient means on stationary supports, to be described, which are stationary and yieldable guide means for retaining the containers 11 in the pockets 12 of the indexing turret. The members 23 are shown mounted as vertically spaced apart, parallel pairs. This action is illustrated on FIG. 3. The elongated resilient member 23 as illustrated in detail on FIG. 4 comprises a relatively closely wound coil spring 24 as a core and this is provided with a cover member 25 of a flexible material that will avoid scratching the sides of the glass containers during handling. The cover, as shown on FIG. 4, is a tube of plastic, nylon being one preferred plastic material, which will engage the glass container without scratching it. Even a flexible tube of a soft metal, such as brass, is usable without scratching the glass, but as stated above, the nylon tube construction is preferred because of its flexibility, wearability and durability in use. The core or spring 24, such as in FIG. 4, is fastened at its opposite ends to pins 26, where are carried by the various stationary brackets secured to the frame 22. Thus, as it may be seen on the drawings, the first resilient guide member 23 is end mounted between end bracket 27 and bracket 28. Bracket 27 is somewhat L-shaped so that its outer extremity is spaced over conveyor 10 and its lateral end member 27a is located more or less as an extension of the guide rail 29 (FIG. 3) along the entry portion on conveyor 10. The guide rail 29 has a laterally spaced companion rail 30 that is parallel and this defines the first path of the containers on the conveyor 10 leading them in single file into a pocket 12 of the turret. The bracket 27 is adjustably mounted on the frame 22 by studs 31 extending through slot 32 and threaded into the underlying frame.

The slot 32 is angularly disposed with relation to conveyor 10 and the radius of turret 13 so as to accommodate the guide function with the rail 29 as the size of containers 11 may vary.

The bracket 28 is similarly mounted to frame 22 by studs 33 in conjunction with slot 34. This slot 34 is substantially parallel with the radius of the turret.

The second resilient guide member 23 is end mounted between bracket 28 and a bracket 35 which is fastened by a stud 36 through the generally radial slot 37 onto frame 22. The third member 23 is mounted between bracket 35 and bracket 38 (FIGS. 1 and 2). The bracket 38 is similarly mounted to frame 22 by stud 39 through slot 40. The farthest or fourth member 23 is end mounted between bracket 38 and a bracket 41. Bracket 41 is fastened by studs 42 through slots 43, tangentially directed, and it is provided with an upturned arm 44 which terminates over the rod 19, that is, rod 19 is spaced beneath the arm 44. The side face of arm 44 also acts as a guide rail on the outgoing conveyor pan of conveyor 10.

By the foregoing, the guide members 23 may easily be adjusted about the periphery of turret 13 so that different size containers 11 may be handled. Of course, inasmuch as all forms of the guide members 23 are provided with a resilient core, such as the spring 24 and others to be described presently, the same members 23 may be used for all size ware. The height of the mountings for the members may be adjusted by the various lock nut connections 28a, 35a, 38a and 41a on the related brackets.

Referring now to FIG. 5, a second form of resilient guide member 23a is shown. This includes a two-piece core made up of end coil springs 50 and an intermediate strap 51. This assembly 50–51 is provided with an exterior covering in the form of a tube of plastic material 25, such as described for the tubular member 25 of FIG. 4. The springs 50 are similarly mounted on the various above-described bracket mountings by the pins 26.

In FIG. 6, a different form of resilient guide member 23b is shown. This consists of a rather tightly wound coil spring 24 that has a plastic coating 25a thereon. This coating, however, is applied by dipping the spring 24 in a liquid bath of a plastic such as a vinyl or plastisol (polyvinyl chloride type plastic). This covering or coating provides the flexible covering for the resilient member which, of course, avoids scratching the sides of glass containers that come into sliding contact with the member 23b. This form of the resilient guide member of the invention is mounted, as are the other above-described forms thereof, by the pins 26 in the various adjustable brackets 27, 28, 35, 38 and 41 on the frame 22.

In light of the foregoing disclosure, two important and distinct features are achieved by the invention. First, when a container is being moved or indexed by the turret or starwheel, the retaining force of the above-described resilient guide member is such that the retaining force is at a maximum when the centrifugal force that is tending to force the bottles from the starwheel is at maximum. Secondly, during movement by the starwheel or pocketed turret, the container will always be retained positively on the back side of the pocket, such as indicated at 60 on FIG. 3 showing the conditions during indexing movement of the turret 13. This subjects the container to less movement within the pocket during transfer and helps preserve the container in better condition, especially under conditions of high speed transfers.

While embodiments of the present invention have been herein specifically described, other embodiments and variations may occur to those skilled in the art after a knowledge of the disclosure herein, and it is desired to include within the scope of the patent granted hereon all such embodiments and variations, and more particularly as comprehended by the appended claims.

I claim:

1. In a machine of the class described having a peripherally pocketed wheel mounted for rotation about a vertical axis, means for intermittently rotating it, and means for bringing articles successively into engagement with a pocket of said wheel as the latter is advanced by rotation and thereafter moved by the wheel during further rotational movement, the pockets of said wheel being indexed by rotation of the wheel into a plurality of peripherally disposed stations for bringing the articles successively into said plural stations, the improvement therein comprising a plurality of resilient guide members each having an article guide surface, means at each of said plural stations for end mounting the resilient members so that said resilient members are disposed in fixed, spatial, peripheral relationship and extending between each of the adjacent stations of said plural stations, each resilient member being flexible radially of said wheel for positively retaining the articles securely in the pockets during their indexing transfer from one of said stations to another of said stations and freeing the articles at each of said stations for inspection, said mounting means comprising spaced stationary brackets, and means for mounting each of them on the machine at each of the said plural stations thereof, said means providing for adjusting the brackets radially with respect to said wheel thereby adjusting the peripheral relationship of said resilient members with respect to said wheel, and a soft, flexible covering for the article guide surface of each of the resilient guide members for contacting the articles thereby during indexing movement by the wheel from station to station.

2. In combination, a rotary turret member rotatably mounted on a vertical shaft and including plural, peripherally spaced, U-shaped pockets thereon for engaging and moving an article fed to the turret in an arcuate path by rotary movement of the turret, a plurality of article inspecting stations, indexing drive means connected to said shaft for intermittently rotating said turret, the pockets of said turret moving successively into said stations by said rotation of the turret, plural elongated spring members, stationary support means for supporting said spring members along the periphery of the turret and extending between each of the adjacent stations thereof for guiding and retaining articles in the pockets of said turret during movement of said articles by said turret along an arcuate path between said adjacent stations, and a sheath covering on each of the said springs composed of a soft, flexible material that will prevent scratching the surface of the articles by sliding contact therewith during movement of the articles between said adjacent stations.

3. The combination of claim 2, wherein said covering comprises an elongated plastic tube encircling each said spring and extending substantially the length thereof.

4. The combination of claim 3, wherein said plastic tube is comprised of nylon.

5. The combination of claim 2, wherein said covering comprises a plastic coating on each said spring which extends substantially the length thereof.

References Cited in the file of this patent

UNITED STATES PATENTS

| | | |
|---|---|---|
| 1,594,465 | Miller | Aug. 3, 1926 |
| 1,844,869 | Hauger | Feb. 9, 1932 |